(12) United States Patent
Kim et al.

(10) Patent No.: US 8,158,692 B2
(45) Date of Patent: Apr. 17, 2012

(54) POLYURETHANE FOAM FOR STEERING WHEEL HAVING IMPROVED WATER RESISTANCE

(75) Inventors: Seok Hwan Kim, Gyeonggi-do (KR); Won Jin Seo, Gyeonggi-do (KR); Joo Young Maeng, Gyeonggi-do (KR); Han Sung Paik, Daejeon (KR); Gi Man Kim, Daejeon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/148,331

(22) Filed: Apr. 18, 2008

(65) Prior Publication Data

US 2009/0156703 A1  Jun. 18, 2009

(30) Foreign Application Priority Data

Dec. 13, 2007  (KR) .................. 10-2007-0130398

(51) Int. Cl.
| C08G 18/48 | (2006.01) |
| C08G 18/50 | (2006.01) |
| C08G 18/32 | (2006.01) |
| C08G 18/79 | (2006.01) |
| C08J 9/08  | (2006.01) |

(52) U.S. Cl. ......... 521/137; 74/552; 521/130; 521/159; 521/160; 521/164; 521/167; 521/168; 521/169; 521/176; 521/177; 525/123; 525/127; 528/65; 528/66; 528/67; 528/77

(58) Field of Classification Search ............ 521/130, 521/137, 159, 160, 164, 167, 168, 169, 176, 521/177; 525/123, 127; 528/65, 66, 67, 528/77; 74/552
See application file for complete search history.

(56) References Cited

U.S. PATENT DOCUMENTS

| 4,866,102 | A  | * | 9/1989  | Pray et al.      | 521/137 |
| 4,916,168 | A  | * | 4/1990  | Pham et al.      | 521/167 |
| 5,043,360 | A  | * | 8/1991  | Pham et al.      | 521/159 |
| 5,216,035 | A  | * | 6/1993  | Harrison et al.  | 521/51  |
| 5,236,960 | A  | * | 8/1993  | Harrison et al.  | 521/51  |
| 5,284,880 | A  | * | 2/1994  | Harrison et al.  | 521/51  |
| 5,338,820 | A  | * | 8/1994  | Harrison et al.  | 528/67  |
| 5,491,175 | A  | * | 2/1996  | Miyazaki et al.  | 521/137 |
| 5,698,609 | A  | * | 12/1997 | Lockwood et al.  | 521/173 |
| 5,770,635 | A  | * | 6/1998  | Lee et al.       | 521/129 |
| 5,798,533 | A  | * | 8/1998  | Fishback et al.  | 252/182.25 |
| 6,077,456 | A  | * | 6/2000  | Narayan          | 252/182.22 |
| 6,127,443 | A  | * | 10/2000 | Perry et al.     | 521/137 |
| 6,316,514 | B1 | * | 11/2001 | Falke et al.     | 521/174 |
| 6,833,390 | B2 | * | 12/2004 | Haider et al.    | 521/130 |
| 2002/0147247 | A1 | * | 10/2002 | Falke et al.  | 521/155 |
| 2002/0151614 | A1 | * | 10/2002 | Falke et al.  | 521/155 |
| 2005/0014857 | A1 | * | 1/2005  | Heinemann et al. | 521/155 |

FOREIGN PATENT DOCUMENTS

| JP | 07-002970 | 1/1995 |
| JP | 07-258372 | 10/1995 |
| KR | 10-2001-0044290 | 6/2001 |
| KR | 10-2001-0079916 | 8/2001 |

OTHER PUBLICATIONS

Szycher, Michael; Szycher's Handbook or Polyurethanes; CRC Press; New York; 1999; pp. 4-26 to 4-31.*

* cited by examiner

*Primary Examiner* — Rabon Sergent
(74) *Attorney, Agent, or Firm* — Edwards Wildman Palmer LLP; Peter F. Corless (57) ABSTRACT

The present invention provides a polyurethane foam for an automobile steering wheel. More particularly, the present invention relates to polyurethane foam formed by using a predetermined amount of a polyol having various functional groups and OH values and a predetermined amount of isocyanate having a certain function, along with water as a foaming agent, thereby preventing the environmental problems caused by use of the conventional fluorine-based or pentane-based foaming agent and also improving durability such as water resistance.

9 Claims, 5 Drawing Sheets

POLYURETHANE FOAM FOR STEERING WHEEL HAVING IMPROVED WATER RESISTANCE

CROSS-REFERENCE TO RELATED APPLICATION

This application claims priority under 35 U.S.C. §119(a) of Korean Patent Application No. 10-2007-0130398 filed on Dec. 13, 2007, the entire contents of which are incorporated herein by reference.

BACKGROUND

(a) Technical Field

The present invention relates to a polyurethane foam with improved water resistance for use in an automobile steering wheel.

(b) Background Art

Polyurethane resin is formed by a chemical reaction between a liquid-phase polyol and a liquid-phase isocyanate, which include intramolecular hydroxy functional group (—OH) and intramolecular isocyanate functional group (—NCO), respectively. A polyol is referred to as monol, diol, triol, etc., depending on the number of intramolecular hydroxy functional group. An isocyanate may also be divided into monoisocyanate, diisocyanate, etc., depending on the number of intramolecular functional group.

Polyurethane resin is generally prepared by reacting a polyol having two or more functional groups with an isocyanate having two or more functional groups. Urethane group is formed by a chemical reaction between the two functional groups existing at the end of each molecule as shown in Scheme 1 below.

R—NCO 30 R'—OH→R—NH—COO—R'  (Scheme 1)

A resin including intramolecular urethane group is referred to as polyurethane resin.

Water reacts with isocyanate molecule in the formation of urethane, thereby forming unstable carbamic acid, which is decomposed to produce amine and carbon dioxide (Scheme 2).

Thus produced amine reacts with isocyanate to form urea group (—NHCONH—) as shown in Scheme 3. Carbon dioxide gas forms small foams in polyurethane resin, thereby forming a dispersed cell structure in polyurethane.

R—NCO+H$_2$O→R—NH—COOH→R—NH$_2$+CO$_2$  (Scheme 2)

R—NH$_2$+R'—NCO→R—NH—CO—NH—R'  (Scheme 3)

Polyurethane foam is used for preparing automobile parts due to its superior properties such as low density, high mechanical property and high heat resistance. In particular, it is widely used as integral skin foam to obtain a leather-like appearance for a steering wheel.

Polyurethane may be divided into an expanded polyurethane and a non-expanded polyurethane, and it is generally the expanded one that is used for automobile parts. For expansion, a foaming agent is included in polyol before a forming reaction. The foaming agent may be divided into physical foaming agent and chemical foaming agent. The physical foaming agent is liquid-phase chemical compound with low boiling point such as fluorocarbon-based compounds (CFC, HCFC, etc.) and pentane-based compounds (pentane, cyclopentane, etc.), which causes expansion when boiled at a relatively high temperature. However, Montreal Protocol or other international regulations calls for an end to the use of the fluorocarbon-based compound to prevent global warming and protect an ozone layer. The pentane-based compounds are difficult to handle due to inflammability and explosiveness. The fluorocarbon-based compounds and the pentane-based compounds may cause problems related to safety and user's health.

Recently, water blown products are being extensively studied to solve these problems by using chemical foaming agent such as water, and some of them have been commercialized.

Figure 1:
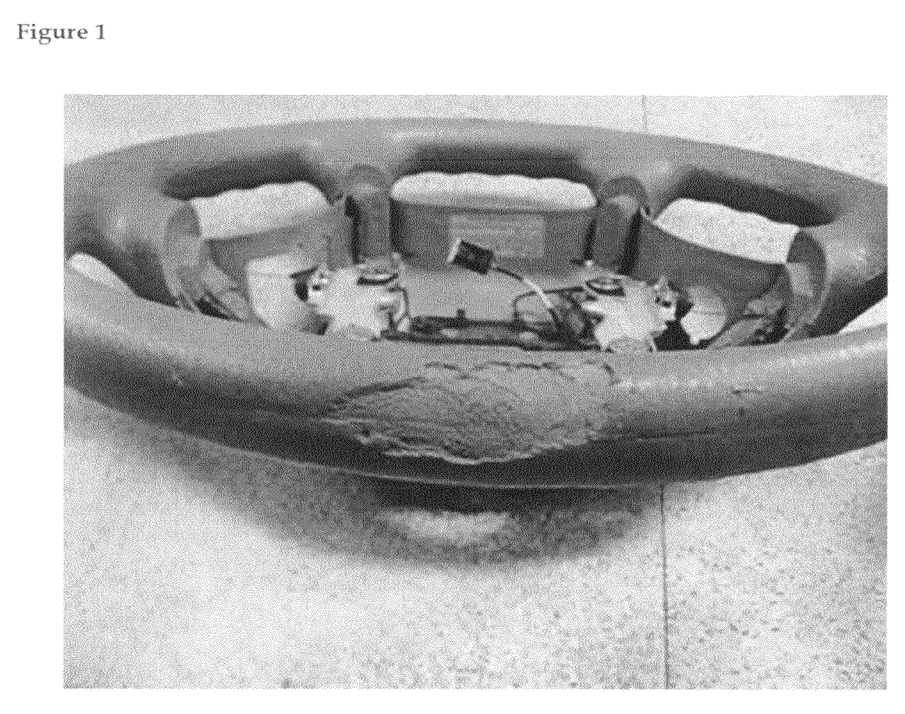
FIG. 1 is a photograph showing the decomposition of a steering wheel caused under a field-use condition.

However, the conventional waterborne polyurethane foam needs to be improved in terms of durability as shown in FIG. 1. There are various issues to be resolved, for example extension of the term of guarantee, aggravated working conditions due to global warming, accelerated aging under various operation conditions as automobile market area is globalized, hydrolysis due to humidity, etc. To solve these problems, in-mold paint has been used so far to minimize cracks and delamination due to abrasion and exposure to moisture or sweat. However, polyurethane may easily be hydrolyzed when the in-mold paint layer is damaged under severe operation conditions, thus necessitating polyurethane to improve durability.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. The present invention is based on the findings that polyurethane resin prepared by using a predetermined amount of a polyol having various number of functional groups and OH values, a pre-selected isocyante having a certain function, a pre-selected chain extender and a pre-selected crosslinking agent along with water as a foaming agent can prevent environmental problems and improve durability such as water resistance.

In one aspect, the present invention provides a polyurethane foam prepared by foaming a mixture comprising: (a) 100 weight parts of a polyol comprising 60.0-95.0 wt% of a polyol A having three functional groups and OH value of 20-40 mgKOH/g, which is formed by a chemical reaction of propylene oxide and ethylene oxide with an initiator; 2.0-10.0 wt% of a polyol B having two functional groups and OH value of 50-400 mgKOH/g, which is formed by a chemical reaction of propylene oxide and ethylene oxide with an initiator; 1.0-10.0 wt% of a polyol C having four functional groups and OH value of 500-800 mgKOH/g, which is formed by a chemical reaction of propylene oxide and ethylene oxide with an initiator; and 2.0-20 wt% of a polyol D having average three functional groups, OH value of 10-30 mgKOH/g and solid value of 30-50%, which is formed by a chemical reaction of propylene oxide, ethylene oxide and styrene monomer with an initiator; (b) 30-70 weight parts of an isocyanate mixture comprising 0.1-30 wt% of monomeric methylene diphenyl diisocyanate (MMDI); 5-70 wt% of carbodiimide-containing methylene diphenyl diisocyanate; 0.1-90 wt% of polymeric methylene diphenyl diisocyanate (PMDI) having molecular weight of 6,000-15,000; and 0.1-90 wt% of prepolymer of methylene diphenyl diisocyanate (MMDI); (c) 1-10 weight parts of glycol having OH value of 1500-2500 mgKOH/g; (d) 0.1-1.0 weight parts of butanediol having OH value of 500-1500 mgKOH/g; (e) 0-5 weight parts of glycerol having OH value of 1500-2500 mgKOH/g; and (f) 0.01-4 weight parts of water.

The polyurethane foam is environment-friendly because water is used as a foaming agent. When used for preparation of a mobile steering wheel, the polyurethane foam increases durability, thereby remarkably decreasing problems such as crack, abrasion, delamination even under severe conditions such as sweat, cosmetics and long-term exposure to solar light.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIGS. 5(a) and (b) are photographs before and after pressurization test, respectively, after accelerated test of water resistance of a steering wheel.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

According to a preferred embodiment, polyurethane foam is prepared by reacting and foaming a mixture comprising a polyol, an isocyanate, a chain extender, a crosslinking agent and a foaming agent at an elevated temperature.

As the polyol, a mixture of various polyols is used. The mixture may comprise a polyol formed by reacting propylene oxide and thylene oxide with an initiator and a polyol formed by reaction of a propylene oxide, ethylene oxide and styrene monomer with an initiator. A preferred example of the polyol formed by reacting propylene oxide and ethylene oxide with an initiator includes: a polyol A having three functional groups and OH value of 20-40 mgKOH/g; a polyol B having two functional groups and OH value of 50-400 mgKOH/g; and a polyol C having four functional groups and OH value of 500-800 mgKOH/g. A preferred example of the polyol formed by reaction of a propylene oxide, ethylene oxide and styrene monomer with an initiator includes a polyol D having three functional groups, OH value of 10-30 mgKOH/g and solid value of 30-50%.

The polyol A having three functional groups and OH value of 20-40 mgKOH/g provides the elasticity of urethane resin. This polyol is formed by a chemical reaction of propylene oxide and ethylene oxide with an initiator which may be selected from the group consisting of glycerol, trimethylol propane, triethanol amine, 1,2,6-hexantriol, phosphoric acid and triisopropanol amine as an initiator. Preferable amount of this polyol A is 60-95 wt% relative to total amount of polyol. When the amount is less than 60 wt%, the elasticity may not be sufficient, thus causing a steering wheel to be hard. When the amount is more than 95 wt%, the rigidity of a steering wheel may not be sufficient.

The polyol B having two functional groups and OH value of 50-400 mgKOH/g increases the chemical resistance to organic solvent, etc., while compensating rigidity. This polyol is formed by a chemical reaction of propylene oxide and ethylene oxide with methyl diethanol amine as an initiator. Preferable amount of this polyol B is 2.0-10.0 wt% relative to total amount of polyol. When the amount is less than 2.0 wt%, the chemical resistance to organic solvent may not be sufficient. When the amount is more than 10.0 wt%, thus prepared polyurethane foam may be vulnerable to chemical decomposition due to water.

The polyol C having four functional groups and OH value of 500-800 mgKOH/g increases rigidity and prevents chemical decomposition. This polyol is formed by a chemical reaction of propylene oxide and ethylene oxide with an initiator which may be selected from the group consisting of pentaerythritol, ethylene diamine, toluene diamine and methyl glucoside as an initiator. This polyol C is preferably used in the amount of 1.0-10.0 wt% relative to total amount of polyol. When the amount is less than 1.0 wt%, the effect of increasing rigidity and preventing decomposition may not be sufficient. When the amount exceeds 10.0 wt %, the resulting urethane foam may be too stiff and surface crack may be generated as it is used for a long period of time.

The polyol D having three functional groups, OH value of 10-30 mgKOH/g and solid value of 30-50% increases the resistance to heat and solar light. This polyol is formed by a chemical reaction of ethylene oxide and styrene monomer with an initiator. This polyol D is preferably used in the amount of 2.0-20 wt% relative to total amount of polyol. When the amount is less than 2.0 wt%, the resistance to heat and solar light may be sufficient. When the amount is more than 20.0 wt%, the moldability during the manufacture of a steering wheel may not be sufficient. The solid value affects rigidity, opening property of cells and viscosity of raw material, and is preferred to be controlled in the range of 30-50% relative to the weight of the polyol D.

As the isocyanate, a mixture of isocyanates with various properties is used. The mixture may, preferably, comprise a monomeric methylene diphenyl diisocyanate (MMDI); a carbodiimide-containing methylene diphenyl diisocyanate; a polymeric methylene diphenyl diisocyanate (PMDI) having molecular weight of 6,000-15,000; and a prepolymer of a methylene diphenyl diisocyanate (MMDI) having molecular weight of 2,000-6,000.

The monomeric methylene diphenyl diisocyanate (MMDI) is used during the manufacture of polyurethane to compensate the softness of polyurethane that can be lowered by the use of polyol with a relatively large number of functional groups, chain extender and crosslinking agent. MMDI is preferably used in the amount of 0.1-30 wt % relative to total amount of isocyante. When the amount is less than 0.1 wt %, the effect of compensating soft property may not be sufficient. When the amount is more than 30 wt %, rigidity and chemical resistance may be lowered.

The carbodiimide-containing methylene diphenyl diisocyanate is used to compensate the instability in low-temperature storage caused by the monomeric methylene diphenyl diisocyanate. The carbodiimide contained therein reacts first with water causing hydrolysis, thus maintaining a chemical bond of polyurethane foam. The carbodiimide-containing methylene diphenyl diisocyanate is preferably used in the amount of 5-70 wt % relative to that of the total amount of isocyanate. When the amount is less than 5 wt %, storage stability at low temperature may not be sufficient. When the amount is more than 70 wt %, reaction becomes too active between carbodiimide and water, thus further lowering chemical resistance.

The polymeric methylene diphenyl diisocyanate (PMDI) having molecular weight of 6,000-15,000 increases chemical resistance and rigidity by increasing crosslinking during the formation of polyurethane. Preferable amount of the PMDI is 0.1-90 wt % relative to total amount of isocyanate. When the amount is less than 0.1 wt %, the cross-liking effect may not be sufficient. When the amount is more than 90 wt %, it may become too stiff and surface cracks may be generated after its use for a long period of time due to excessive crosslinking.

The prepolymer of methylene diphenyl diisocyanate (MMDI) having molecular weight of 2,000-6,000 controls micro property of prepolymer. This is preferably used in the amount of 0.1-90 wt % relative to total amount of isocyanate. When the amount is less than 0.1 wt %, the effect of controlling the property may not be sufficient. When the amount is more than 90 wt %, rigidity, water-resistance and chemical resistance of a steering wheel may be lowered.

The isocyanate mixture is preferably used in the amount of 30-70 weight parts relative to 100 weight parts of the polyol mixture. When the amount is less than 30 weight parts, stickiness, etc., may be caused due to the increase in the amount of non-reacted polyol. When the amount is more than 70 weight parts, excessive isocyanate reacts with moisture in air, thereby causing surface crack and hardening.

As the chain extender, preferably, a mixture comprising glycol having OH value of 1500-2500 mgKOH/g and a butandiol having OH value of 500-1500 mgKOH/g is used to control the elasticity and the feel of a steering wheel.

The glycol having OH value of 1500-2500 mgKOH/g is preferably used in the amount of 1-10 weight parts relative to 100 weight parts of the polyol mixture. When the amount is less than 1 weight part, elasticity may not be sufficient. When the amount is more than 10 weight parts, rigidity and grip feeling of a steering wheel may be lowered due to excessively high elasticity.

The butandiol having OH value of 500-1500 mgKOH/g is preferably used in the amount of 0.1-1.0 weight parts relative to 100 weight parts of the polyol mixture. When the amount is less than 0.1 weight parts, the grip feeling may not be satisfactory. When the amount is more than 1.0 weight part, a long-term use may cause deformation.

As the crosslinking agent, suitably, glycerol having OH value of 1500-2500 mgKOH/g may be added, which increases the degree of crosslinking, thus improving rigidity and chemical resistance.

The glycerol crosslinking agent having 1500-2500 mgKOH/g is preferably used in the amount of 0-5 weight parts relative to 100 weight parts of the polyol. When the amount is more than 5 weight parts, surface crack may be generated after the use for a long period of time due to excessive crosslinking.

Water is used as a foaming agent when the polyol, isocyanate and chain extender are reacted with each other. Water reacts with isocyante to produce carbon dioxide as shown in Schemes 2-3, thereby forming foams in polyurethane resin. Water is preferably used in the amount of 0.014 weight parts relative to 100 weight parts of the polyol mixture. When the amount is less than 0.01 weight parts, the production of carbon dioxide is not sufficient and the resin may not serve as foam. When the amount is more than 4 weight parts, the durability of polyurethane resin may be drastically decreased.

Polyurethane foam can be prepared by any conventional reactor in a batch-wise or continuous manner, followed by heating process. Reaction conditions such as temperature, pressure, etc., may be selected as known in the art. It should be noted that reaction conditions do not limit those described in the specification for illustrative purposes.

Preferably, one or more additives such as a curing catalyst, an expanding catalyst and a UV stabilizer may be added during the manufacture of polyurethane foam.

EXAMPLES

The present invention is illustrated with reference to the following examples but they should not be construed as limiting the scope of the present invention.

Example 1

Polyurethane foam was formed by using reactants as described in the following tables. The reaction was conducted by using a high-pressure foaming machine for polyurethane at 25° C. under 160 bar (discharge pressure) for 2 minutes.

| | Polyol | | | |
|---|---|---|---|---|
| | OH value (mgKOH/g) | Number of functional group | Manufacturer | Amount (wt %) |
| 1[1] | 30 | 3 | BASF | 83 |
| 2[2] | 100 | 2 | BASF | 5 |
| 3[3] | 600 | 4 | BASF | 2 |
| 4[4] | 20 | 3 | BASF | 10.0 |

[1] Polyol having three functional groups and OH value of 20-40 mgKOH/g
[2] Polyol having two functional groups and OH value of 50-400 mgKOH/g
[3] Polyol having four functional groups and OH value of 500-800 mgKOH/g
[4] Polyol having three functional groups, OH value of 10-30 mgKOH/g and solid value of 30-50%

| | Isocyanate | |
|---|---|---|
| | Manufacturer | Amount (wt % relative to 100 wt % of the polyol) |
| 1[1] | BASF | 20 |
| 2[2] | BASF | 30 |
| 3[3] | BASF | 30 |
| 4[4] | BASF | 20 |

[1] monomeric methylene diphenyl diisocyanate (MMDI)
[2] carbodiimide-containing methylene diphenyl diisocyanate
[3] polymeric methylene diphenyl diisocyanate (PMDI)
[4] prepolymer of MMDI having an increased molecular weight The isocyanate was used in the amount of 50 weight parts relative to 100 weight parts of the polyol mixture.

| Chain extender and crosslinking agent | | |
|---|---|---|
| | Product name | Amount (weight parts relative to 100 weight parts of the polyol) |
| 1[1)] | glycol (Glycol) | 5 |
| 2[2)] | butandiol (Butane diol) | 0.5 |
| 3[3)] | glycerol (Glycerol) | 2 |

[1)] glycol having OH value of 1500-2500 mgKOH/g
[2)] butandiol having OH value of 500-1500 mgKOH/g
[3)] glycerol having OH value of 1500-2500 mgKOH/g

| Foaming agent | |
|---|---|
| Product name | Amount (weight parts relative to 100 weight parts of the polyol) |
| Water | 2 |

Polyurethane resin was prepared by adding a small amount of a catalyst, a UV stabilizer and a dye as additives.

Comparative Example 1

Polyurethane resin was prepared as set forth in Examples except using the conventional polyol, chain extender, crosslinking agent and isocyanate as known in the prior art. Each ingredient and its content are provided in the table below.

| Ingredients | Content (weight parts) | Description |
|---|---|---|
| Polyol #1 | 80 | A polyol having three functional groups and OH value of 30-100 mgKOH/g |
| Polyol #2 | 20 | A polyol having three functional groups, OH value of 30-80 mgKOH/g and solid value of 30-40% |
| Glycol | 1 | Glycol having OH value of 1500-2500 mgKOH/g |
| Glycerol | 0 | Not used |
| Butandiol | 0 | Butandiol having OH value of 500-1500 mgKOH/g |
| Prepolymer | 55 | Prepolymer of isocyanate (MMDI) |

Evaluation of Water Resistance

Polyurethane foams formed in Example 1 and Comparative Example 1 were applied to an automobile steering wheel for forming polyurethane integral skin foam. Specimens with size of 5-15 cm were obtained from the region opposite to the inlet of raw material, and used for the evaluation of water resistance under the following conditions.

Figure 4:
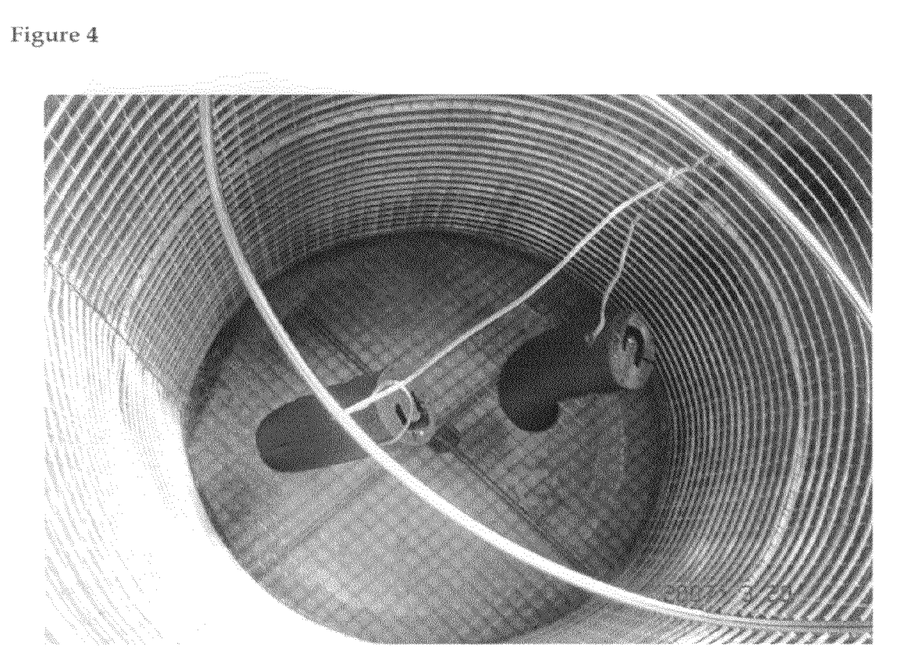
FIG. 4 is a photograph showing how to load specimen.

An autoclave (1 L) was filled with water (300 cc), and a specimen was loaded perpendicularly in the autoclave (FIG. 4). The autoclave was completely sealed and maintained at 120° C. for 48 hours. Pressure inside the autoclave was maintained at 1-2 bars. The specimen was taken out of the autoclave, and scratched with finger nail. Change in surface properties such as crack, stickiness and rigidity was evaluated with the naked eye.

Whether the specimen is broken or not was also evaluated with the naked eye after the specimen was bent at two ends by 180 degrees. Whether cracks are produced or not was also evaluated with the naked eye after the specimen was pressurized as shown in FIG. 5(a, b).

Neither crack nor stickiness was observed in specimens prepared in Example 1, while specimens prepared in Comparative Example 1 were easily broken when scratched with finger nail and showed stickiness.

Figure 2:
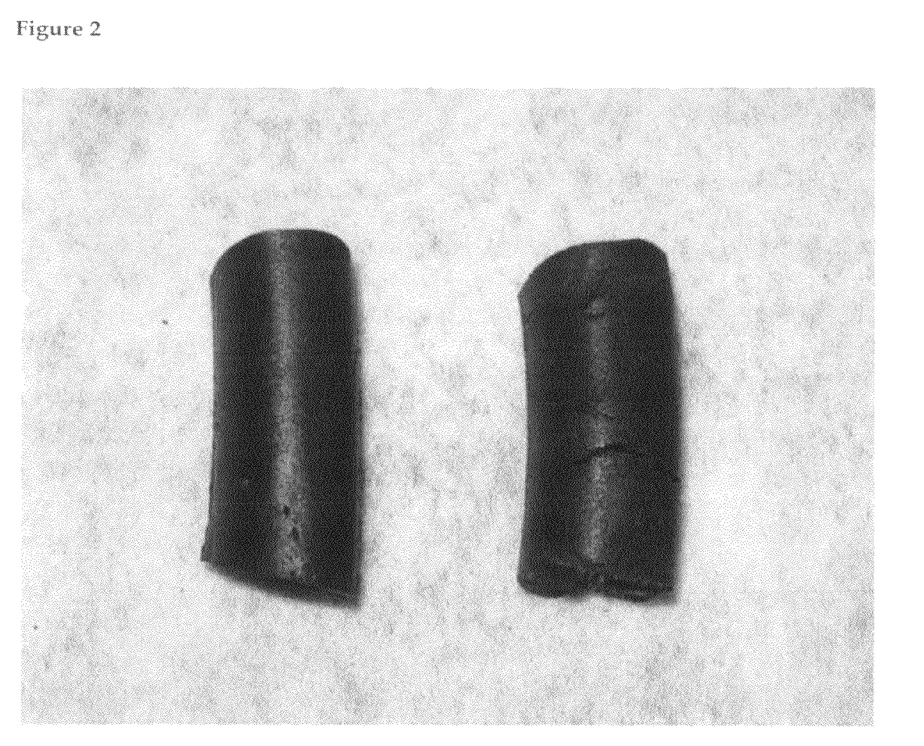
FIG. 2 is a photograph showing the crack results of specimens prepared in Example 1 and Comparative Example 1, respectively, after an autoclave test.
Figure 3:
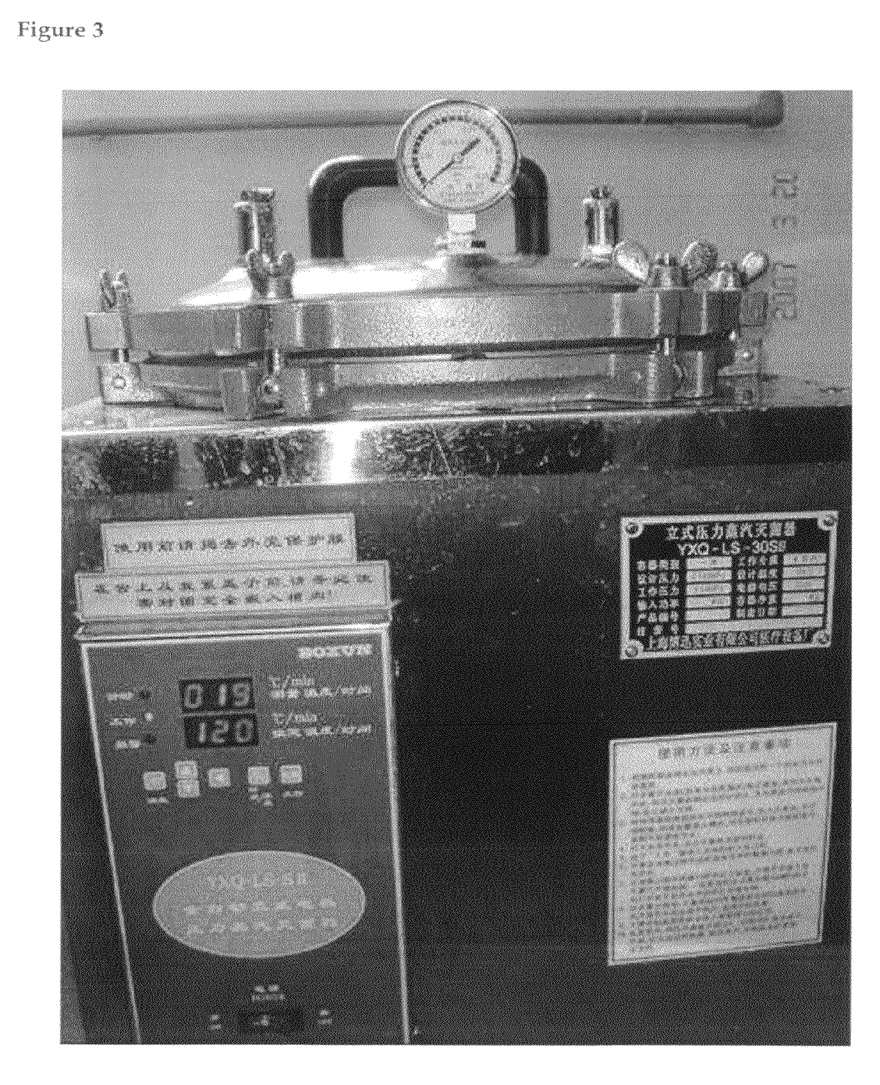
FIG. 3 is a photograph of an autoclave.
Figure 5:
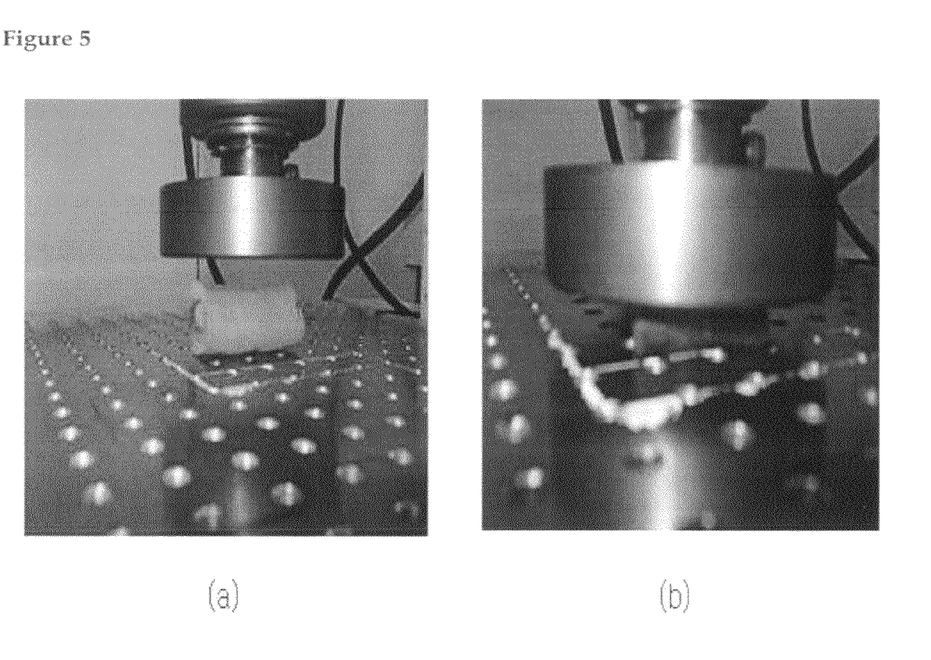

Further, specimens of Example 1 showed no crack when bent at two ends or pressurized as in FIG. 5, while specimens of Comparative Example 1 showed cracks (FIG. 2).

Therefore, it ascertains that a steering wheel prepared by using polyurethane foam according to the preferred embodiment of the present invention is superior to a steering wheel prepared by using the conventional polyurethane foam in water resistance.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A polyurethane foam for use in a steering wheel of a vehicle, comprising:
   (a) 100 weight parts of a polyol comprising: 60.0-95.0 wt % of a polyol A having three functional groups and OH value of 20-40 mgKOH/g; 2.0-10.0 wt % of a polyol B having two functional groups and OH value of 50-400 mgKOH/g; 1.0-10.0 wt % of a polyol C having four functional groups and OH value of 500-800 mgKOH/g; and 2.0-20 wt % of a polyol D having three functional groups, OH value of 10-30 mgKOH/g and solid value of 30-50%, wherein polyol A is different than polyol D, wherein the wt % are relative to the total weight of polyol;
   (b) 30-70 weight parts of an isocyanate comprising 0.1-30 wt % of monomeric methylene diphenyl diisocyanate (MMDI); 5-70 wt % of carbodiimide-containing methylene diphenyl diisocyanate; 0.1-90 wt % of polymeric methylene diphenyl diisocyanate (PMDI); and 0.1-90 wt % of a methylene diphenyl diisocyanate (MMDI) prepolymer, wherein the wt % are relative to the total weight of isocyanate;
   (c) 1-10 weight parts of glycol having OH value of 1500-2500 mgKOH/g;
   (d) 0.1-1.0 weight parts of butandiol;
   (e) 0-5 weight parts of glycerol; and
   (f) 0.01-4 weight parts of water.

2. The polyurethane foam of claim 1, where the polyol A having three functional groups and OH value of 20-40 mgKOH/g is formed by the reaction of propylene oxide and ethylene oxide with an initiator selected from the group consisting of glycerol, trimethylol propane, triethanol amine, 1,2,6-hexantriol, phosphoric acid, triisopropanol amine, and mixtures thereof.

3. The polyurethane foam of claim 1, where the polyol B having two functional groups and OH value of 50-400 mgKOH/g is formed by the reaction of propylene oxide and ethylene oxide with an initiator, the initiator being methyl diethanol amine.

4. The polyurethane foam of claim 1, where the polyol C having four functional groups and OH value of 500-800 mgKOH/g is formed by the reaction of propylene oxide and ethylene oxide with an initiator selected from the group consisting of pentaerythritol, ethylene diamine, toluene diamine, methyl glucoside and mixtures thereof.

5. The polyurethane foam of claim 1, where the mixture further comprises at least one additive selected from the group consisting of curing catalyst, expanding catalyst and UV stabilizer.

6. A steering wheel of a vehicle comprising the polyurethane foam of claim 1.

7. A vehicle comprising a steering wheel of claim 6.

8. The polyurethane foam of claim 1 wherein each of components (a), (b), (c), (d), (e) and (f) are each distinct components of the foam.

9. A polyurethane composition, comprising:
(a) 100 weight parts of a polyol comprising: 60.0-95.0 wt % of a polyol A having three functional groups and OH value of 20-40 mgKOH/g; 2.0-10.0 wt % of a polyol B having two functional groups and OH value of 50-400mgKOH/g; 1.0-10.0 wt % of a polyol C having four functional groups and OH value of 500-800 mgKOH/g; and 2.0-20 wt % of a polyol D having three functional groups, OH value of 10-30 mgKOH/g and solid value of 30-50%, wherein polyol A is different than polvol D, wherein the wt % are relative to the total weight of polyol;
(b) 30-70 weight parts of an isocyanate comprising 0.1-30 wt % of monomeric methylene diphenyl diisocyanate (MMDI); 5-70 wt % of carbodiimide-containing methylene diphenyl diisocyanate; 0.1-90 wt % of polymeric methylene diphenyl diisocyanate (PMDI);
and 0.1-90 wt % of a methylene diphenyl diisocyanate (MMDI) prepolymer, wherein the wt % are relative to the total weight of isocyanate;
(c) 1-10 weight parts of glycol having OH value of 1500-2500 mgKOH/g;
(d) 0.1-1.0 weight parts of butandiol;
(e) 0-5 weight parts of glycerol; and
(f) 0.01-4 weight parts of water,
(a), (b), (c), (d), (e) and (f) are each distinct components of the composition.

* * * * *